United States Patent
Kawaguchi et al.

(10) Patent No.: US 7,875,842 B2
(45) Date of Patent: Jan. 25, 2011

(54) SOLID STATE IMAGE PICKUP ELEMENT AND CAMERA SYSTEM

(75) Inventors: Takashi Kawaguchi, Nagasaki (JP); Kenichi Tanaka, Nagasaki (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/699,521

(22) Filed: Feb. 3, 2010

(65) Prior Publication Data

US 2010/0141500 A1    Jun. 10, 2010

Related U.S. Application Data

(63) Continuation of application No. 12/332,574, filed on Dec. 11, 2008, now Pat. No. 7,683,307.

(30) Foreign Application Priority Data

Jan. 18, 2008    (JP) ............... 2008-009002

(51) Int. Cl.
*H01J 40/14* (2006.01)
(52) U.S. Cl. ............... 250/214 DC; 250/214 R; 250/214 A; 341/155
(58) Field of Classification Search ......... 250/214 R, 250/214 A, 214 LA, 214 DC, 214 SW; 341/155, 341/172; 330/308, 59, 252
See application file for complete search history.

(56) References Cited

U.S. PATENT DOCUMENTS

| | | | |
|---|---|---|---|
| 7,683,307 B2 * | 3/2010 | Kawaguchi et al. ...... 250/208.1 |
| 2005/0195304 A1 | 9/2005 | Nitta et al. | |
| 2009/0128653 A1 | 5/2009 | Tanaka | |

FOREIGN PATENT DOCUMENTS

| | | |
|---|---|---|
| JP | 08-078975 | 3/1996 |
| JP | 2005-278135 | 10/2005 |
| JP | 2007-019682 | 1/2007 |

OTHER PUBLICATIONS

Yang et al., "An Integrated 800×600 CMOS Image Systems", ISSCC Digest of Technical Papers, pp. 304-305, Feb. 1999.

* cited by examiner

*Primary Examiner*—Kevin Pyo
(74) *Attorney, Agent, or Firm*—Robert J. Depke; Rockey, Depke & Lyons, LLC

(57) ABSTRACT

A solid state image pickup element includes a pixel unit having a plurality of pixels for photoelectric conversion disposed in a matrix shape and a pixel signal read circuit for reading pixel signals in the unit of a plurality of pixels from the pixel unit. The pixel signal read circuit includes a plurality of comparators disposed in correspondence with a pixel column layout for performing comparison judgment between a read signal potential and a reference voltage and outputting a judgment signal and a plurality of counters each for counting a comparison time of a corresponding one of the comparators, an operation being controlled by an output from a corresponding one of the comparators. The comparators include a first amplifier for performing a comparison operation between the reference voltage and the read signal potential and inverting an output at a predetermined comparison point, a second amplifier for forming a current path when an output of the first amplifier is inverted, to output an output of the first amplifier by gain up, and a current control circuit for shutting the current path of the second amplifier when an output level of the second amplifier exceeds a predetermined threshold level.

9 Claims, 12 Drawing Sheets

SOLID STATE IMAGE PICKUP ELEMENT AND CAMERA SYSTEM

The subject matter of application Ser. No. 12/332,574, is incorporated herein by reference. The present application is a Continuation of U.S. Ser. No. 12/332,574, filed Dec. 11, 2008, which claims priority to Japanese Patent Application Number JP 2008-009002, filed Jan. 18, 2008. The present application claims priority to these previously filed applications.

BACKGROUND OF THE INVENTION

1. Field of the Invention

The present invention relates to a solid state image pickup device represented by a CMOS image sensor and a camera system.

2. Description of Related Art

A CMOS image sensor has been paid attention as a solid state image pickup device (image sensor) to be substituted for CCD.

This is because the CMOS image sensor overcomes various issues of CCD, including the necessity for dedicated processes for manufacturing CCD pixels and for a plurality of power source voltages for the operation, and a very complicated system because a plurality of peripheral IC's are required to be combined for the operation.

A CMOS image sensor has a plurality of large merits: manufacturing processes similar to those for a general CMOS type integrated circuit can be used for manufacturing CMOS image sensors, a single power source can drive a CMOS image sensor, and the number of peripheral IC's can be reduced because analog circuits and logic circuits manufactured by CMOS processes can be used by being mixed on the same chip.

A main trend of a CCD output circuit is a one channel (1-ch) output using a floating diffusion (FD) amplifier having an FD layer.

In contrast, a main trend of a CMOS image sensor is a column parallel output type in which each pixel is provided with an FD amplifier, and by selecting each row of a pixel array, outputs of FD amplifiers are read in a column direction at the same time.

It is difficult for only an FD amplifier disposed in each pixel to obtain a sufficient drive ability so that a data rate is required to be lowered. In this context, it is considered that parallel processing is advantageous.

Really a variety of types have been proposed for a signal output circuit of a column parallel output type CMOS image sensor.

As a method used for pixel signal reading of a CMOS image sensor, there is a method by which signal charges to be used as an optical signal generated by a photoelectric conversion element such as a photodiode are sampled temporarily via a MOS switch disposed near the photoelectric conversion element in a capacitor, and the signal charges are read.

Noises having inverse correlation to a sampling capacitor value are generally superposed upon a sampling circuit. In a pixel, when signal charges are transferred to the sampling capacitor, the signal charges are transferred perfectly by utilizing a potential gradient so that noises will not be generated at the sampling stage. However, noises are generated at a preceding stage where a voltage level of capacity is reset to a reference value.

A typical method of eliminating these noises is correlated double sampling (CDS). With this approach, a state (reset level) immediately before signal charges are sampled is read and stored, then a signal level after sampling is read, and noises are eliminated through subtraction.

There are a variety of specific CDS methods.

Description will be made on a general CMOS image sensor.

FIG. 1 is a diagram showing an example of a pixel of a CMOS image sensor constituted of four transistors.

This pixel 10 has a photoelectric conversion element such as photodiode 11, and four transistors as active elements for one photodiode 11. The four transistors include a transfer transistor 12, an amplifier transistor 13, a select transistor 14 and a reset transistor 15.

The photodiode 11 photoelectrically converts incidence light into charges (in this example, electrons) corresponding in amount to the quantity of the incidence light.

The transfer transistor 12 is connected between the photodiode 11 and a floating diffusion FD. Upon application of a drive signal to the gate (transfer gate) via a transfer control line LTx, electrons photoelectrically converted by the photodiode 11 is transferred to the floating diffusion FD.

A gate of the amplifier transistor 13 is connected to the floating diffusion FD. The amplifier transistor 13 is connected via the select transistor 14 to a signal line LSGN, and constitutes a source follower together with a constant current source 16 outside the pixel.

An address signal is applied to the gate of the select transistor 14 via a select control line LSEL, and when the select transistor 14 turns on, the amplifier transistor 13 amplifies a potential at the floating diffusion FD to output a voltage corresponding to the potential to the output (vertical) signal line LSGN. A signal voltage output from each pixel via the signal line LSGN is output to a pixel signal read circuit.

The reset transistor 15 is connected between a power supply line LVDD and the floating diffusion FD. When a reset signal is applied to the gate via a reset control line LRST, the reset transistor resets a potential at the floating diffusion FD to a potential at the power supply line LVDD.

More specifically, when the pixel is to be reset, the transfer transistor 12 is turned on to drain charges accumulated in the photoelectric conversion element 11, and then the transfer transistor 12 is turned off to make the photoelectric conversion element 11 convert an optical signal into charges and accumulate the charges.

When data is to be read, the reset transistor 15 is turned on to reset the floating diffusion FD, and then the reset transistor 15 is turned off to output a voltage at the floating diffusion FD via the amplifier transistor 13 and select transistor 14. This output is called a P phase output.

Next, the transfer transistor 12 is turned on to transfer charges accumulated in the photoelectric conversion element 11 to the floating diffusion FD, and a voltage at the floating diffusion FD is output via the amplifier transistor 13. This output is called a D phase output.

By using a difference between the D phase output and P phase output as an image signal, it becomes possible to remove not only a variation in output DC components among pixels but also reset noises of the floating diffusion FD from the image signal.

These operations are performed for pixels of one row at the same time because the gates of, e.g., the transfer transistor 12, select transistor 14 and reset transistor 15 are connected on the row unit basis.

Really a variety of pixel signal read (output) circuits of a column parallel output type CMOS image sensor have been proposed. One of the most advanced types of this circuit has an analog-digital converter unit (hereinafter abbreviated to ADC (analog digital converter)) disposed at each column to output a digital signal as the image signal.

A CMOS image sensor mounting the column parallel ADC of this type is disclosed, for example, in W. Yang et. al., "An integrated 800×600 CMOS Image System" ISSCC Digest of Technical Papers, pp. 304-305, February, 1999 and Japanese Patent Unexamined Publication No. 2005-278135.

FIG. 2 is a block diagram showing an example of the structure of a column parallel ADC mounting solid state image pickup device (CMOS image sensor).

As shown in FIG. 2, the solid state image pickup device 20 has a pixel unit 21 as an imaging unit, a vertical scan circuit 22, a horizontal transfer scan circuit 23, a timing control circuit 24, an ADC group 25, a digital-analog conversion unit (hereinafter abbreviated to DAC (digital-analog converter)) 26, an amplifier circuit (S/A) 27 and a signal processing circuit 28.

The pixel unit 21 includes photodiodes and intra-pixel amplifiers, and is constituted of pixels such as shown in FIG. 1 disposed in a matrix shape.

In the solid state image pickup device 20, the timing control circuit 24 for generating internal clocks, the vertical scan circuit 22 for controlling row addresses and row scan and the horizontal transfer scan circuit 23 for controlling column addresses and column scan are disposed as the control circuit for sequentially reading a signal from the pixel unit 21.

The ADC group 25 has ADCs disposed at a plurality of columns, each ADC being constituted of a comparator 25-1 for comparing a reference voltage Vslop having a ramp waveform obtained by stepwise changing a reference voltage generated by DAC 26 with an analog signal obtained from a pixel at each row via a vertical signal line, a counter 25-2 for counting a comparison time, and a latch 25-3 for holding a count result.

The ADC group 25 has an n-bit digital signal conversion function, each ADC being disposed at each vertical signal line (column line) to constitute a column parallel ADC block.

An output of each latch 25-3 is connected to a horizontal transfer line 29 having, for example, a 2n-bit width.

2n amplifier circuits 27 corresponding to the horizontal transfer line 29 and a signal processing circuit 28 are disposed.

In the ADC group 25, an analog signal (potential Vsl) read to the vertical signal line is compared with the reference voltage Vslop (a slope waveform having a certain gradient and changing linearly) at the comparator 25-1 disposed at each column.

In this case, the counter 25-2 disposed at each column similar to the comparator 25-1 is in operation and changes its count in one-to-one correspondence with the potential Vslop of the ramp waveform, to thereby convert a potential (analog signal) Vsl at a vertical signal line into a digital signal.

A change in the reference voltage Vslop is used for converting a voltage change into a time change, and the converted time is counted at a certain period (clock) to convert the time into a digital value.

When the analog electric signal Vsl crosses the reference voltage Vslop, an output of the comparator 25-1 is inverted to stop an input clock to the counter 25-2 and complete AD conversion.

After completion of the above-described AD conversion period, the horizontal transfer scan circuit 23 operates to input data held in the latches 25-3 to the signal processing circuit 28 via the horizontal transfer line 29 and amplifier circuit 27 to generate a two-dimensional image.

In this manner, the column parallel output process is performed.

SUMMARY OF THE INVENTION

As described above, in the column parallel ADC mounting CMOS image sensor (column AD type CMOS image sensor), the comparator compares a ramp wave from DAC with a pixel signal, and the counter at the succeeding stage performs digital CDS to realize AD conversion.

Generally, a comparator has a two-stage amplifier structure. A low speed signal comparison operation is performed at the first stage narrowing an operation band, and second amplifier at the second stage performs a gain up.

More specifically, the comparator has the structure that the first amplifier having a narrowed operation band performs a low speed signal comparison operation to a reference voltage (Vref, ramp waveform) and a vertical signal line signal (Vsl) which is an output amplified by a pixel amplifier transistor (FD amplifier), and the result is amplified by the second amplifier.

Particularly in the second amplifier, during the initialization of the comparator (hereinafter called during an AZ operation), a gate voltage of a transistor (e.g., n-channel MOS (NMOS) transistor) is set so that a half of current flowing in the first amplifier flows in the second amplifier. Also after the AZ operation, a gate voltage of the NMOS transistor is maintained by the capacitor connected to the gate so that same amounts of currents flow. With this arrangement, a circuit variation to be caused by process difference is suppressed.

However, with this arrangement, the second amplifier has the structure that current flows steadily after inversion (e.g., inversion from a low level (L) to a high level (H)) of an output of the comparator. Different states, so-called power source steps, of an analog power source occur before and after comparator output inversion. This may cause streaking and shading during photographing.

The signal level Vsl at the vertical signal line becomes different between bright and dark states and an inversion point of the comparator shifts in the context of time. Therefore, a time while a steady current flows in the second amplifier depends on lightness. A change in the power source state dependent upon lightness may degrade streaking.

The present invention provides a solid state image pickup device capable of suppressing a steady current and realizing low consumption power and low noises and a camera system.

According to a first aspect of the present invention, there is provided a solid state image pickup device including a pixel unit having a plurality of pixels for photoelectric conversion disposed in a matrix shape and a pixel signal read circuit for reading pixel signals in the unit of a plurality of pixels from the pixel unit. The pixel signal read circuit includes a plurality of comparators disposed in correspondence with a pixel column layout for performing comparison judgment between a read signal potential and a reference voltage and outputting a judgment signal and a plurality of counters each for counting a comparison time of a corresponding one of the comparators, an operation of each counter being controlled by an output from a corresponding one of the comparators. Each of the comparators include a first amplifier for performing a comparison operation between the reference voltage and the read signal potential and inverting an output at a predetermined comparison point, a second amplifier for forming a current path when an output of the first amplifier is inverted, to gain up and output an output of the first amplifier and a current control circuit for shutting the current path of the second amplifier when an output level of the second amplifier exceeds a predetermined threshold level.

Preferably, the current control circuit includes a current switch disposed in the current path of the second amplifier and a logical circuit for maintaining the current switch in an on-state until the output level of the second amplifier exceeds the predetermined threshold level, and turning off the current switch when the output level exceeds the threshold level.

Preferably, the second amplifier includes a first conductivity type gate input transistor to a gate of which an output of the first amplifier is input and a second conductivity type transistor serially connected to the first conductivity type transistor in which an initialization switch for determining an operation point for each column at row operation start is disposed between a gate and a drain and a gate of the second conductivity type transistor is connected to a capacitor for an initialization sampling. The current switch of the current control circuit is disposed in the current path including the first conductivity type gate input transistor and the second conductivity type transistor serially connected and the logical circuit performs a logical operation between an output level of the second amplifier and an initialization signal for turning on/off the initialization switch to turn on/off the current switch.

Preferably, an output of the first amplifier is adapted to be set to a predetermined level by a standby signal. The second amplifier includes a first conductivity type gate input transistor to a gate of which an output of the first amplifier is input and a second conductivity type transistor serially connected to the first conductivity type transistor in which an initialization switch for determining an operation point for each column at row operation start is disposed between a gate and a drain and a gate of the second conductivity type transistor is connected to a capacitor for initialization sampling The current switch of the current control circuit is disposed in the current path including the first conductivity type gate input transistor and the second conductivity type transistor serially connected. The logical circuit performs a logical operation between an output level of the second amplifier and the standby signal to turn on/off the current switch.

Preferably, an output of the first amplifier is adapted to be set to a predetermined level by a standby signal. The second amplifier includes a first conductivity type gate input transistor to a gate of which an output of the first amplifier is input and a second conductivity type transistor serially connected to the first conductivity type transistor in which an initialization switch for determining an operation point for each column at row operation start is disposed between a gate and a drain and a gate of the second conductivity type transistor is connected to a capacitor for initialization sampling. The current switch of the current control circuit is disposed in the current path including the first conductivity type gate input transistor and the second conductivity type transistor serially connected. The logical circuit performs a logical operation with an output level of the second amplifier, an initialization signal for turning on/off the initialization switch and the standby signal to turn on/off the current switch.

Preferably, the logical circuit turns on/off the current switch in accordance with a level at an output node of the second amplifier.

Preferably, the solid state image pickup device further includes an output unit for receiving an output signal of the second amplifier and outputting the signal as an output signal of the comparator. The logical circuit turns on/off the current switch in accordance with an output level of the output unit.

Preferably, the reference voltage has a slope waveform having a gradient and changing linearly. The first conductivity type gate input transistor of the second amplifier turns off until the read signal and the slope waveform of the reference voltage cross, and the first amplifier outputs a comparison output having a level allowing the first conductivity type gate input transistor to turn on, to the second amplifier after crossing.

According to a second aspect of the present invention, there is provided a camera system including a solid state image pickup device and an optical system for focusing an object image upon the solid state image pickup element. The solid state image pickup element includes a pixel unit having a plurality of pixels for photoelectric conversion disposed in a matrix shape and a pixel signal read circuit for reading pixel signals in the unit of a plurality of pixels from the pixel unit. The pixel signal read circuit includes a plurality of comparators disposed in correspondence with a pixel column layout for performing comparison judgment between a read signal potential and a reference voltage and outputting a judgment signal and a plurality of counters each for counting a comparison time of a corresponding one of the comparators, an operation being controlled by an output from the comparators. Each of the comparator includes a first amplifier for performing a comparison operation between the reference voltage and the read signal potential and inverting an output at a predetermined comparison point, a second amplifier for forming a current path when an output of the first amplifier is inverted, to output an output of the first amplifier by gain up, and a current control circuit for shutting the current path of the second amplifier when an output level of the second amplifier exceeds a predetermined threshold level.

According to the present invention, in the pixel signal read circuit, a comparison/judgment operation between a read signal potential and a reference voltage is performed and a judgment signal is outputted. An operation of the counter is controlled by an output of the comparator and a comparison time of a corresponding comparator is counted.

The reference voltage has, for example, a slope waveform having a gradient and changing linearly. The first conductivity type gate input transistor of the second amplifier turns off until the read signal and the slope waveform of the reference voltage cross, and the first amplifier outputs a comparison output having a level allowing the first conductivity type gate input transistor to turn on, to the second amplifier after crossing.

Accordingly, an output of the first amplifier is output from the second amplifier by gained up.

When an output level of the second amplifier exceeds the predetermined threshold level, the current path of the second amplifier is shut.

According to the present invention, a constant current can be suppressed so that low consumption power and low noises can be realized.

DETAILED DESCRIPTION OF THE EMBODIMENTS

Embodiments of the present invention will now be described in connection with the accompanying drawings.

Figure 3:
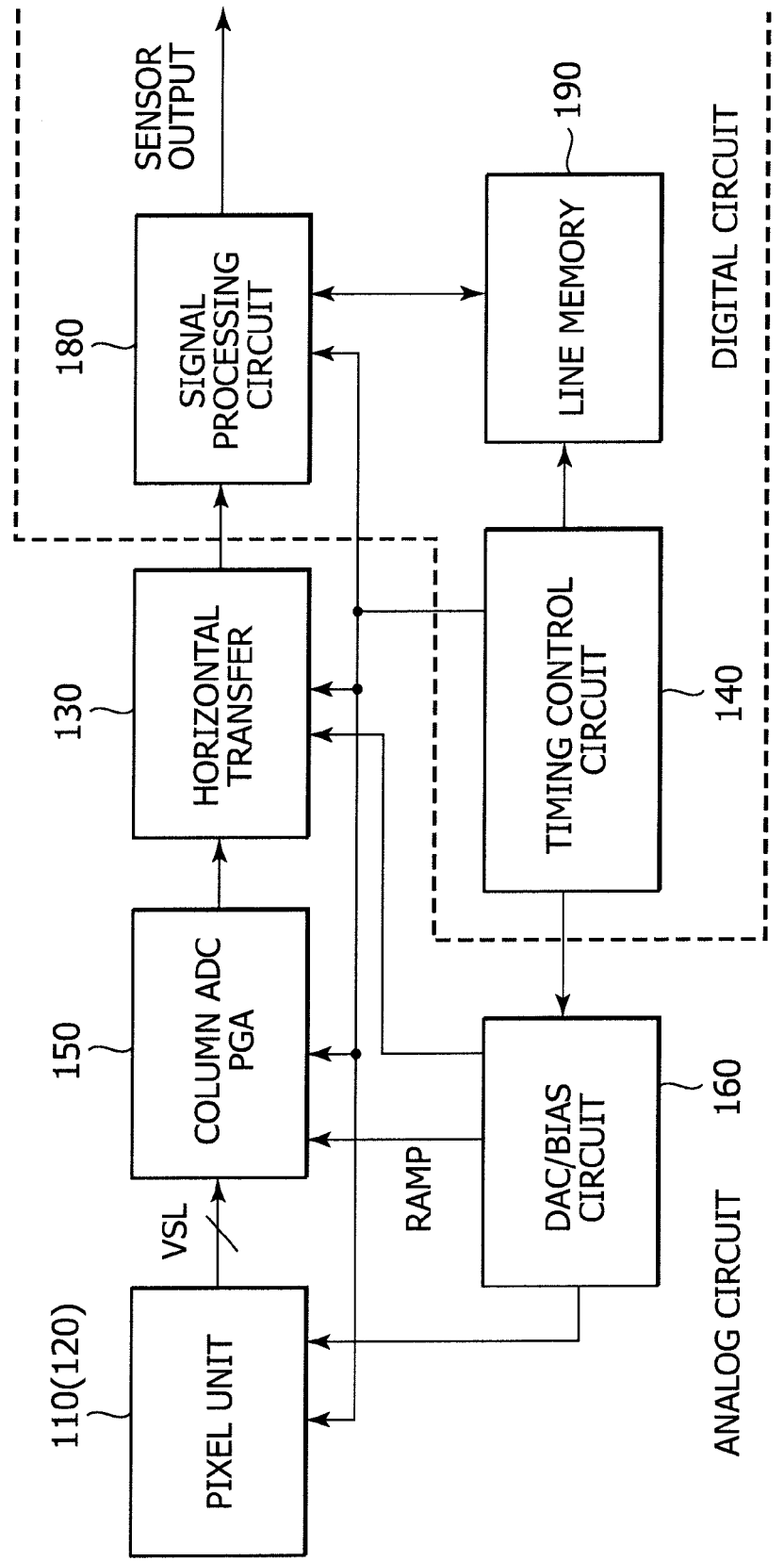
FIG. 3 is a block diagram showing an example of the structure of a column parallel ADC mounting solid state image pickup element (CMOS image sensor) according to an embodiment of the present invention.

FIG. 3 is a block diagram showing an example of the structure of a column parallel ADC mounting solid state image pickup element (CMOS image sensor) according to an embodiment of the present invention.

Figure 4:
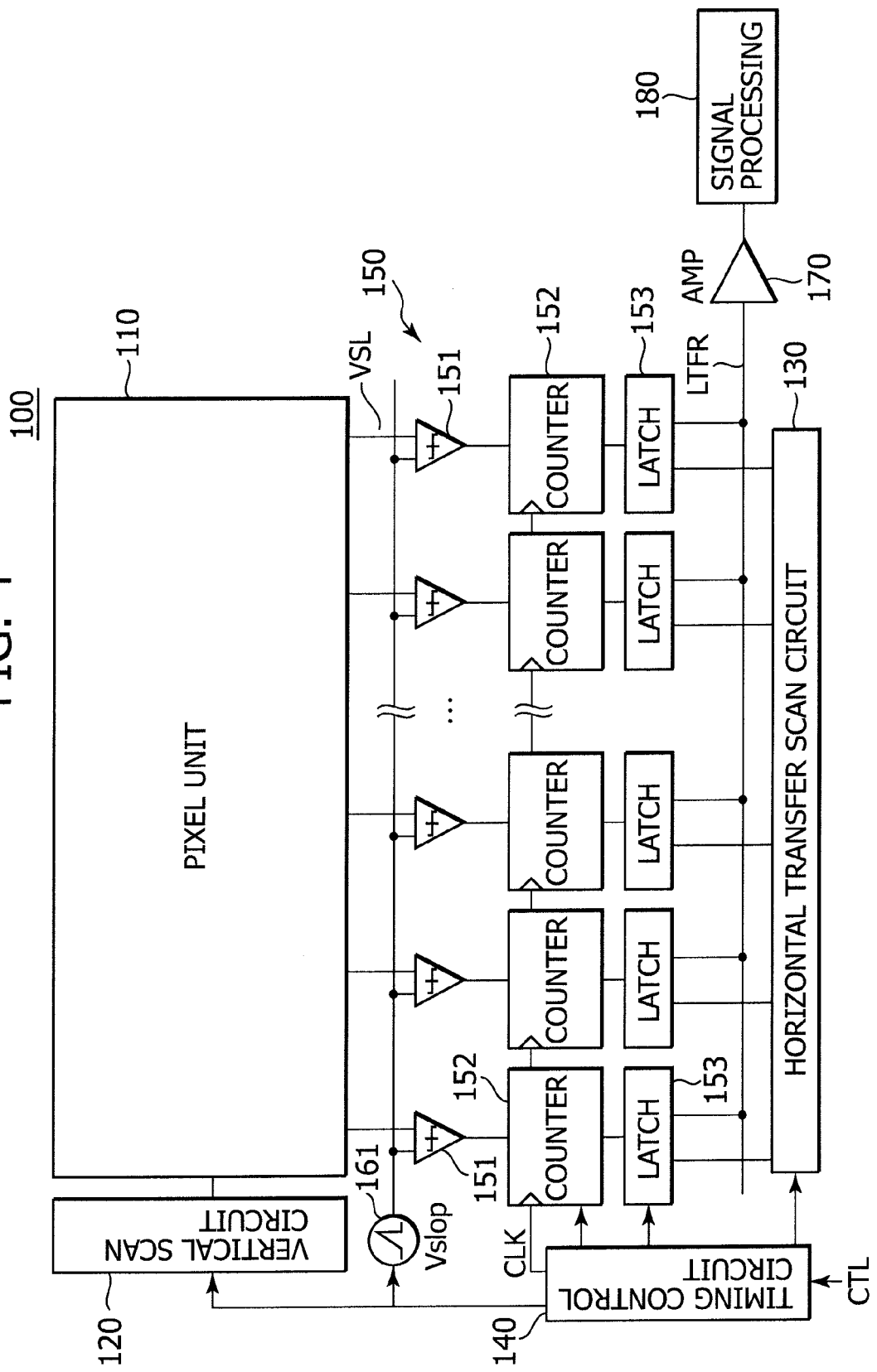
FIG. 4 is a block diagram showing more specifically an ADC group of the column parallel ADC mounting solid state image pickup element (CMOS image sensor) shown in FIG. 3.

FIG. 4 is a block diagram showing more specifically an ADC group of the column parallel ADC mounting solid state image pickup element (CMOS image sensor) shown in FIG. 3.

As shown in FIGS. 3 and 4, a solid state image pickup element 100 has a pixel unit 110 as an imaging unit, a vertical scan circuit 120, a horizontal transfer scan circuit 130, a timing control circuit 140, an ADC group 150 as a pixel signal read circuit, a DAC and bias circuit 160 including a DAC (digital-analog converter) 161, an amplifier circuit (S/A) 170, a signal processing circuit 180 and a line memory 190.

Of these constituent components, analog circuits are used for the pixel unit 110, vertical scan circuit 120, horizontal transfer scan circuit 130, ADC group 150, DAC and bias circuit 160 and amplifier circuit (S/A) 170.

Digital circuits are used for the timing control circuit 140, signal processing circuit 180 and line memory 190.

Figure 1:
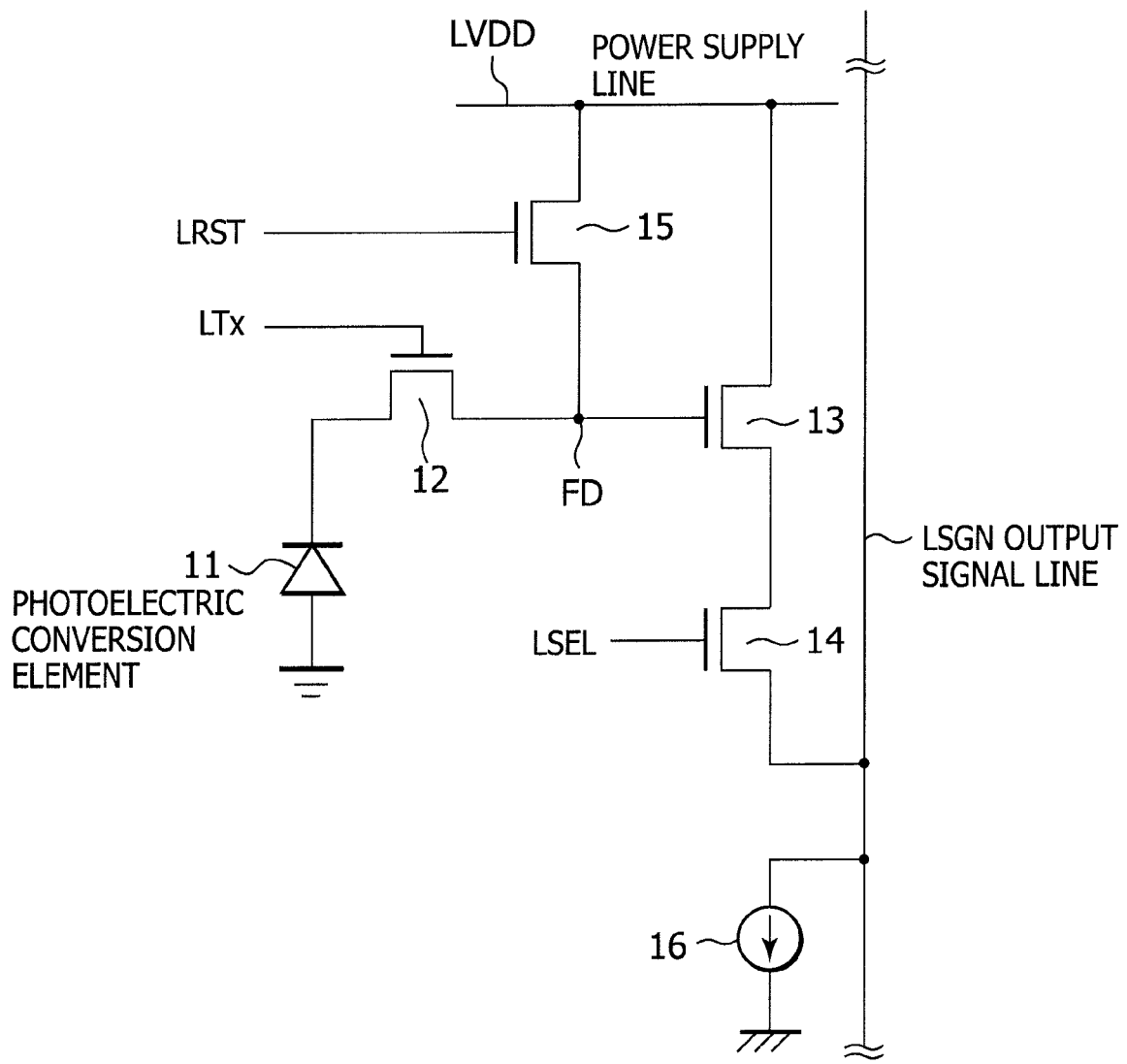
FIG. 1 is a diagram showing an example of a pixel of a CMOS image sensor constituted of four transistors.
Figure 2:
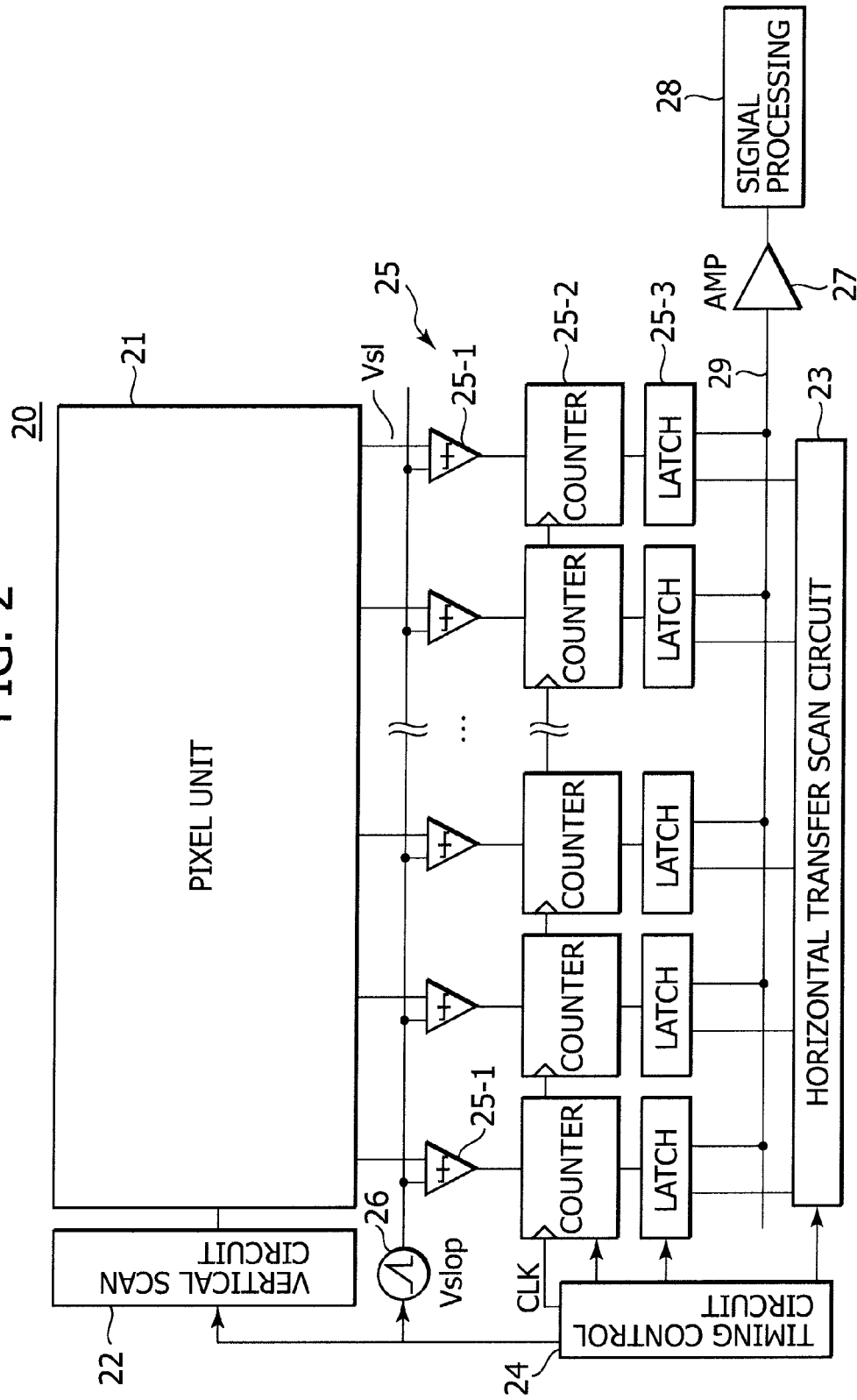
FIG. 2 is a block diagram showing an example of the structure of a column parallel ADC mounting solid state image pickup element (CMOS image sensor)

The pixel unit 110 includes photodiodes and intra-pixel amplifiers, and is constituted of pixels such as shown in FIG. 1 disposed in a matrix shape.

In the solid state image pickup element 100, the timing control circuit 140 for generating internal clocks, the vertical scan circuit 120 for controlling row addresses and row scan and the horizontal transfer scan circuit 130 for controlling column addresses and column scan are disposed as the control circuit for sequentially reading signals from the pixel unit 110.

The timing control circuit 140 generates timing signals necessary for signal processing by the pixel unit 110, vertical scan circuit 120, horizontal transfer scan circuit 130, ADC group (column ADC circuit) 150, DAC and bias circuit 160, signal processing circuit 180 and line memory 190.

In the pixel unit 110, by utilizing photon accumulation and discharge using a line shutter, a video and a screen image are photoelectrically converted in each pixel row, and an analog signal VSL is output to the ADC group.

In the ADC group 150, each ADC block (each column unit) performs for an analog output from the pixel unit 110, APGA compatible integration type ADC using a ramp signal RAMP supplied from DAC 161 and digital CDS, to output a digital signal of several bits.

The ADC group 150 has ADCs disposed at a plurality of columns, each ADC being constituted of a comparator 151 for comparing a reference voltage Vslop having a ramp waveform (RAMP) obtained by stepwise changing a reference voltage generated by DAC 161 with an analog signal (potential VSL) obtained from a pixel at each row via a vertical signal line, a counter 152 for counting a comparison time of the comparator, and a latch 153 for holding a count result.

The ADC group 150 has an n-bit digital signal conversion function, each ADC being disposed at each vertical signal line (column line) to constitute a column parallel ADC block.

An output of each latch 153 is connected to a horizontal transfer line having, for example, a 2n-bit width.

2n amplifier circuits 170 corresponding to the horizontal transfer line LTRF and a signal processing circuit 180 are disposed.

Specific structure and function of the comparator 151 will be described later in detail.

In the ADC group 150, an analog signal (potential VSL) read to the vertical signal line is compared with the reference voltage Vslop (a ramp signal RAMP of a slope waveform having a certain gradient and changing linearly) at the comparator 151 disposed at each column.

In this case, the counter 152 disposed at each column similar to the comparator 151 is in operation and count values are changed in one-to-one correspondence with the ramp signal RAMP (potential Vslop), to thereby convert a potential (analog signal) VSL at a vertical signal line into a digital signal.

A change in the reference voltage Vslop (ramp signal RAMP) is used for converting a voltage change into a time change, and the converted time is counted at a certain period (clock) to convert the time into a digital value.

When the analog signal VSL crosses the ramp signal RAMP (reference voltage Vslop), an output of the comparator 151 is inverted to stop an input clock to the counter 152 and complete AD conversion.

After completion of the above-described AD conversion period, the horizontal transfer scan circuit 130 operates to transfer data held in the latches 153 to a horizontal transfer line LTRF and input the data to the signal processing circuit 180 via the amplifier 170 to generate a two-dimensional image by predetermined signal processing.

The horizontal transfer scan circuit 130 performs concurrent parallel transfer of several channels in order to ensure a transfer rate.

The timing control circuit 140 generates timings necessary for signal processing by respective blocks such as the pixel unit 110 and ADC group 150.

The signal processing circuit 180 at the succeeding stage performs digital signal processing for the signal stored in the line memory 190. This digital signal processing includes correction of vertical line defects and point defects, signal clamping, parallel-serial conversion, compression, encoding, addition, averaging, intermittent operation and the like.

The line memory 190 stores digital signals transmitted from each pixel row.

In the solid state image pickup element 100 of the present embodiment, a digital output of the signal processing circuit 180 is transmitted as an input to an ISP and a baseband LSI.

In the ADC group (pixel signal read circuit) 150 of the present embodiment, the comparator 151 is structured in such a manner that an output of a second amplifier is monitored, and when the output exceeds a certain threshold value voltage, a transistor as s switch disposed in an output current path of the second amplifier is turned off to allow the current to be stopped after the output of the second amplifier is inverted.

In examples of first and second structures, each comparator 151 disposed at each column has first and second amplifiers cascade-connected, and performs initialization (auto zero: AZ) in order to determine an operating point at each column at the row operation start.

The first amplifier at the first stage performs low speed signal comparison operation to narrow an operation band, and the second amplifier at the next stage performs raise up.

It is configured that during AZ, after a pixel signal crosses the RAMP waves of P- and D-phases, a constant current is suppressed to realize low consumption power, a change in an analog power state (power step) before and after inversion of an output of the comparator is alleviated to realize a reduction in imaging noises such as streaking and shading and suppress a change in power state to be caused by light/dark conditions.

Description will now be made on the structure and function of the comparator 151 of the ADC group (pixel signal read circuit) 150 having the structure characteristic to the embodiment.

In this embodiment, a first conductivity type is a p- or n-channel, and a second conductivity type is an n- or p-channel.

A comparator to be described hereunder is represented by reference numeral 200.

Figure 5:
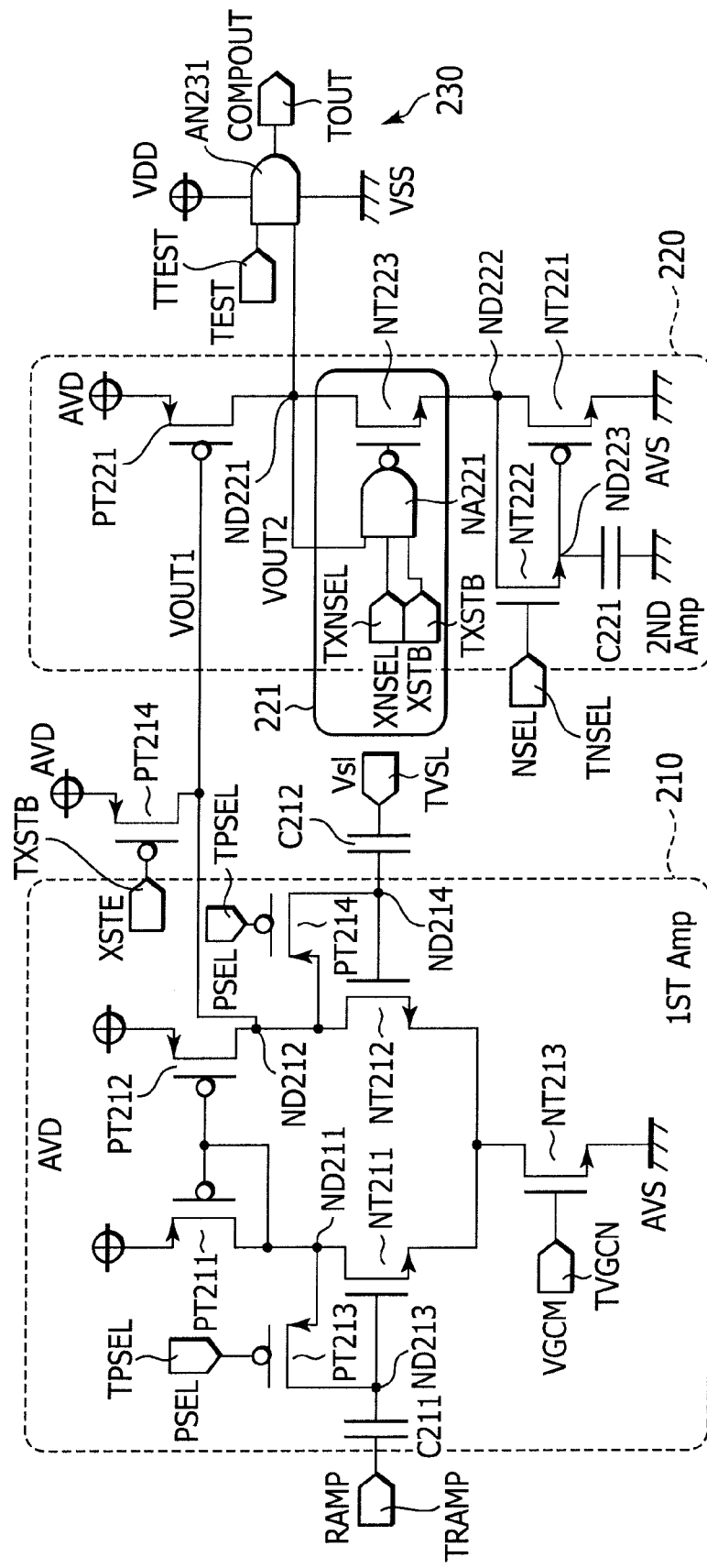
FIG. 5 is a circuit diagram showing an example of a first structure of a comparator according to the present embodiment.

FIG. 5 is a circuit diagram showing an example of a first structure of the comparator according to the present embodiment.

As shown in FIG. 5, the comparator 200 has first and second amplifiers 210 and 220 cascade-connected and an output unit 230.

The first amplifier 210 has p-channel MOS (PMOS) transistors PT211 to PT214, n-channel MOS (NMOS) transistors MT211 to NT213, and first and second capacitors C211 and C212 as sampling capacitors of an AZ level.

Sources of the PMOS transistors PT211 and PT212 are connected to a power source potential AVD.

A drain of the PMOS transistor PT211 is connected to a drain of the NMOS transistor NT211, and its connection point forms a node ND211. The drain and gate of the PMOS transistor PT211 are connected, and its connection point is connected to a gate of the PMOS transistor PT212.

A drain of the PMOS transistor PT212 is connected to a drain of the NMOS transistor NT212, and its connection point forms an output node ND212 of the first amplifier.

Emitters of the NMOS transistors NT211 and NT212 are connected together, and its connection point is connected to a drain of the NMOS transistor NT213. A source of the NMOS transistor NT213 is connected to a reference potential AVS (ground potential GND).

A gate of the NMOS transistor NT211 is connected to a first electrode of the capacitor C211, and its connection point forms a node ND213. A second electrode of the capacitor C211 is connected to an input terminal TRAMP of a ramp signal RAMP.

A gate of the NMOS transistor NT212 is connected to a first electrode of the capacitor C212, and its connection point forms a node ND214. A second electrode of the capacitor C212 is connected to an input terminal TVSL of an analog signal VSL.

A gate of the NMOS transistor NT213 is connected to an input terminal TVGCM of a bias signal VGCM.

A source of the PMOS transistor PT213 is connected to the node ND211, and a drain is connected to the node ND213. A source of the PMOS transistor PT214 is connected to the node ND212, and a drain is connected to the node ND214.

Gates of the PMOS transistors PT213 and PT214 are connected in common to an input terminal TPSEL of a first AZ signal PSEL which is active and low level.

A source of the PMOS transistor PT214 is connected to the power source potential AVD, a drain is connected to the output node ND212, and a gate is connected to an input terminal TXSTB of an output standby signal XSTB which is active and low level.

In the first amplifier 210 having the above-described structure, the PMOS transistors PT211 and PT212 constitute a current mirror circuit, and the NMOS transistors NT211 and NT212 constitute a differential comparison unit using the NMOS transistor NT213 as a current source.

The PMOS transistors PT213 and PT214 function as AZ switches, and the capacitors C211 and C212 function as sampling capacitors of the AZ level.

An output signal VOUT1 of the first amplifier 210 is output from the output node ND212 to the second amplifier 220.

The second amplifier 220 has a PMOS transistor PT221, NMOS transistors NT221, NT222, and NT223, a third capacitor C221 as a sampling capacitor of the AZ level, and a three-input NAND circuit NA221.

The NMOS transistor NT223 and three-input NAND circuit NA221 constitute a current control circuit 221.

A source of the PMOS transistor PT221 is connected to the power source potential AVD, and a gate is connected to an output node ND212 of the first amplifier 210.

A drain of the PMOS transistor PT221 is connected to a drain of the NMOS transistor NT223, and its connection point forms an output node ND221.

A drain of the NMOS transistor NT223 as a current switch is connected to the drain of the NMOS transistor NT221, and its connection point forms a node ND222.

A source of the NMOS transistor NT221 is connected to the reference potential AVS (ground potential GND), a gate is connected to a first electrode of the capacitor C221, and its connection point forms a node ND223. A second electrode of the capacitor C221 is connected to the reference potential AVS (ground potential GND).

A drain of the NMOS transistor NT222 is connected to the node ND222, and a source is connected to the node ND223.

A gate of the PMOS transistor PT222 is connected in common to an input terminal TNSEL of a second AZ signal NSEL which is active and high level.

The second AZ signal NSEL takes a complementary level of the first AZ signal PSEL supplied to the first amplifier 210.

A first input of the three-input NAND circuit NA221 is connected to the output node ND221 of the second amplifier 220, a second input is connected to an input terminal TXNSEL of an inverted signal XNSEL of the second AZ signal NSEL, and a third input is connected to an input terminal TXSTB of a standby signal XSTB which is active and low level.

An output of the NAND circuit NA221 is connected to a gate of the NMOS transistor NT223.

In the second amplifier 220 having the above-described structure, the PMOS transistor PT221 constitutes an input/current source circuit.

The NMOS transistor NT222 functions as an AZ switch, and the capacitor C221 functions as a sampling capacitor of the AZ level.

The NMOS transistor NT223 functions as a current switch for turning on/off an output current path.

The gate level of the NMOS transistor NT223 is controlled by an output of the NAND circuit NA221. Input to the NAND circuit NA221 are an output VOUT2 of the second amplifier 220, the inversion signal XNSEL of the AZ (initialization) signal of the second amplifier 220 and the output standby signal XSTB of the first amplifier 210.

When the output VOUT2 of the second amplifier 220 exceeds a threshold voltage of the NAND circuit NA221, the NMOS transistor NT223 turns off to cut a constant current flowing through the second amplifier 220.

As the AZ (initialization) signal XNSEL of the second amplifier 220 is input to the NAND circuit NA 221, the AZ signal XNSEL falls to the low level to fix an output of the NAND circuit NA221 to a high level at AZ operation. In this manner, the initialization operation of the second amplifier 220 can be performed surely.

Since an output current value determined by the initialization operation is held in the capacitor C221 until an output of the second amplifier 220 is inverted, durability of an inversion point and a process variation of the second amplifier 220 will not be degraded.

Further, as the output standby signal XSTB of the first amplifier 210 is input to the NAND circuit NA221 and as the P phase operation transits to the D phase operation, the output standby signal XSTB falls to the low level and an output of the NAND circuit NA221 is fixed to the high level. It is therefore possible to surely reset (H→L) an output of the second amplifier 220.

With the arrangement described above, a reliable circuit operation can be expected even with a complicated correlated double sampling (CDS) operation.

The output unit 230 is constituted of a two-input AND circuit AN231.

A first input of the AND circuit AN231 is connected to the output node ND221 of the second amplifier 220, a second input is connected to an input terminal TTEST of a control signal TEST, and an output is connected to an output terminal TOUT of the comparator 200.

Description will be made next on the operation of the comparator 200 of the present embodiment, in connection with a timing chart shown in FIG. 6.

Figure 6:
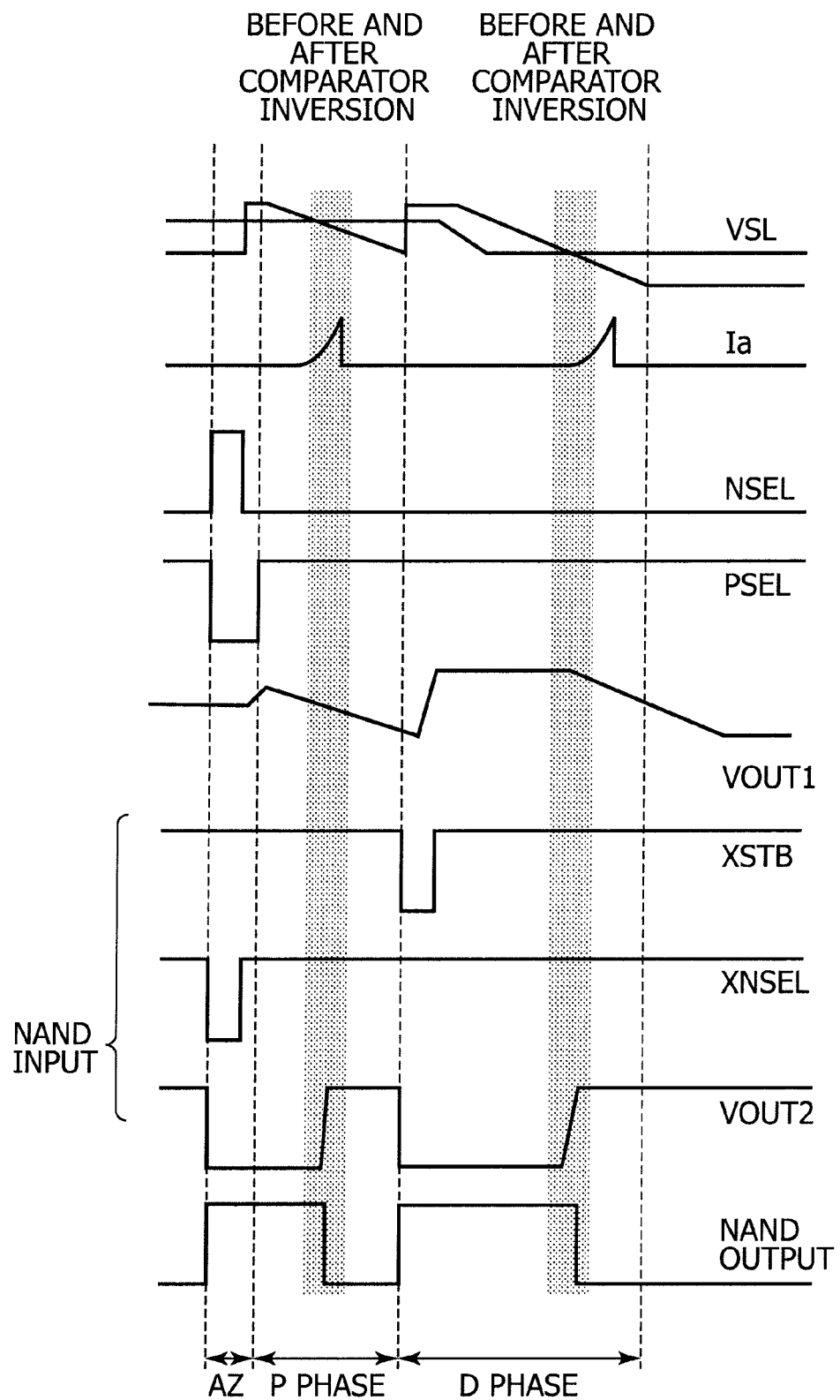
FIG. 6 is a timing chart of the comparator shown in FIG. 5.

It is to be noted in FIG. 6 that the first AZ signal PSEL takes fundamentally a complementary level of the second AZ signal NSEL as described above. Namely, when the second AZ signal NSEL takes a high level, the first AZ signal PSEL takes a low level, whereas when the second AZ signal NSEL takes a low level, the first AZ signal PSEL takes a high level.

In the comparator 200, during the AZ period, the first AZ signal PSEL of a low level and the second AS signal NSEL of a high level are supplied. Therefore, the PMOS transistors PT213 and PT214 as the AZ switches of the first amplifier 210 turn on. Similarly, the NMOS transistor NT222 as the AZ switch of the second amplifier 220 turns on.

In this manner, in the ADC group, by using the comparator 200 (151), the DAC offset level, pixel reset level and AZ level at each column are first sampled to accumulate electric charges in the AZ level sampling capacitors C211, C212 and C221.

Next, upon completion of the AZ period, the second AZ signal NSEL is switched to a low level, and then the first AZ signal PSEL is switched to a high level.

Therefore, the NMOS transistor NT222 as the AZ switch of the second amplifier 220 turns off. Similarly, the PMOS transistors PT213 and PT214 as the AZ switches of the first amplifier 210 turn off.

In this manner, integration type AD conversion (hereinafter called a P phase) for a pixel reset level starts.

Since electric charges are accumulated in the capacitor C221 of the second amplifier 220, a potential at the node ND222 takes a level capable of conducting the NMOS transistor.

Also in this case, as shown in FIG. 6, inputs to the NAND circuit NA221 are the output standby signal XSTB of the first amplifier 210 at a high level, the inversion signal XNSEL of the second AZ signal NSEL at a low level (during the AZ period) or a high level, and the output signal VOUT2 of the second amplifier 220 at a low level. An output of the NAND circuit NA221 is therefore maintained at a high level.

As a result, the NMOS transistor NT221 and the NMOS transistor NT223 as the current switch of the second amplifier 220 are maintained in an on-state.

In the first amplifier 210 of the comparator 200, in the P phase, the sampling capacitors C211 and C212 accumulated during the AZ period are in a high impedance (HiZ) state at the nodes ND213 and ND214 on the side of the gates of the NMOS transistors NT211 and NT212.

Therefore, gate inputs of the NMOS transistors NT211 and NT212 constituting differential transistors changes by following a ramp wave change of the ramp signal RAMP from DAC 161 to start comparison with the pixel signal VSL level.

After the ramp signal RAMP crosses the pixel signal, the output signal VOUT1 of the first amplifier 210 changes steeply.

As a result, the PMOS transistor PT221 of the second amplifier 220 turns on, a current Ia starts flowing, and the output VOUT2 of the second amplifier 220 changes from the low (L) level to the high (H) level.

As the output VOUT2 of the second amplifier 220 changes from the low (L) level to the high (H) level, an output of the NAND circuit NA221 is switched to a low level. Therefore, the NMOS transistor NT223 as the switch is switched to an off-state so that an output path of the current Ia is cut and will not flow.

When the P phase operation is transited to the D phase operation, the output standby signal XSTB of the first amplifier 210 falls from the high level to the low level which is input to the NAND circuit NA221. As a result, an output of the NAND circuit NA221 is fixed to a high level.

The NMOS transistor NT223 is therefore switched to the on-state, electric charges at the output node ND221 are discharged, and an output of the second amplifier 220 is reset reliably.

As the output standby signal XSTB of the first amplifier 210 falls from the high level to the low level during a predetermined period, the PMOS transistor PT214 turns on so that a level of the output signal VOUT1 of the first amplifier 210 rises to the level of the power source potential AVD.

In the D phase, the comparator 200 at each column operates in a manner similar to the P phase.

Figure 7:
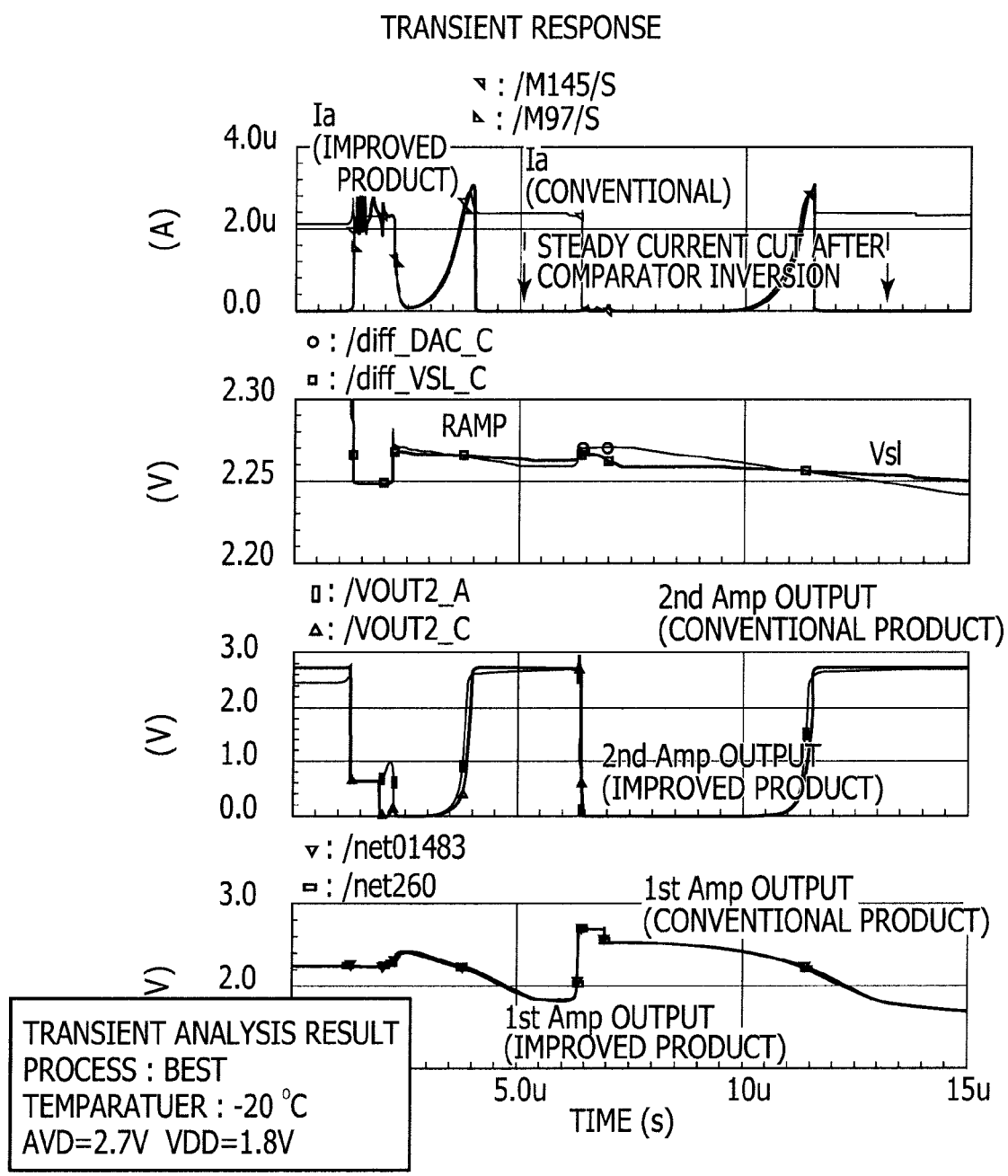
FIG. 7 is a diagram showing operation simulation waveforms of the comparator (improved product) of the present embodiment and a related art type comparator (related art product)

FIG. 7 is a diagram showing operation simulation waveforms of the comparator (improved product) of the embodiment and a related art type comparator (related art product).

As seen from FIG. 7, it can be confirmed that in the comparator of the embodiment, a steady current Ia (improved product) is cut after an output of the second amplifier 220 is inverted (L→H), as also indicated in the timing chart of FIG. 6.

Figure 8:
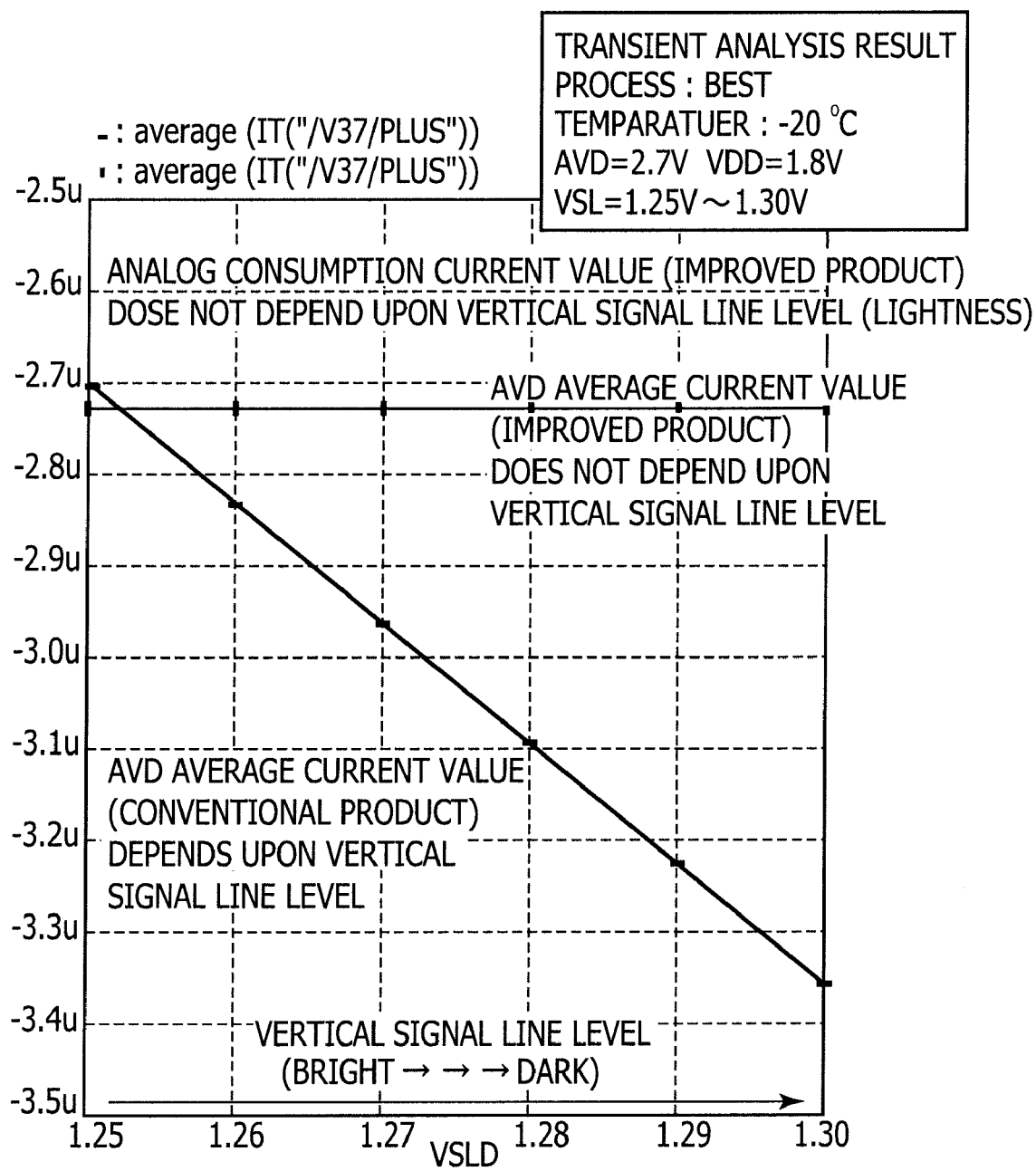
FIG. 8 is a diagram showing correlation between a vertical signal line level and a constant current flowing in the second amplifier of the comparator (improved product) of the present embodiment and a related art type comparator (related art product)

FIG. 8 is a diagram showing correlation between a vertical signal line level and a steady current flowing in the second amplifier with respect to the comparator (improved product) of the embodiment and a related art type comparator (related art product).

As seen also from the correlation between the vertical signal line level (VSL) and a steady current flowing in the second amplifier shown in FIG. 8, it can be understood that an AVD average current value (improved product) is constant and does not depend on incident lightness upon pixels, irrespective of the vertical signal line level (VSL).

Figure 9:
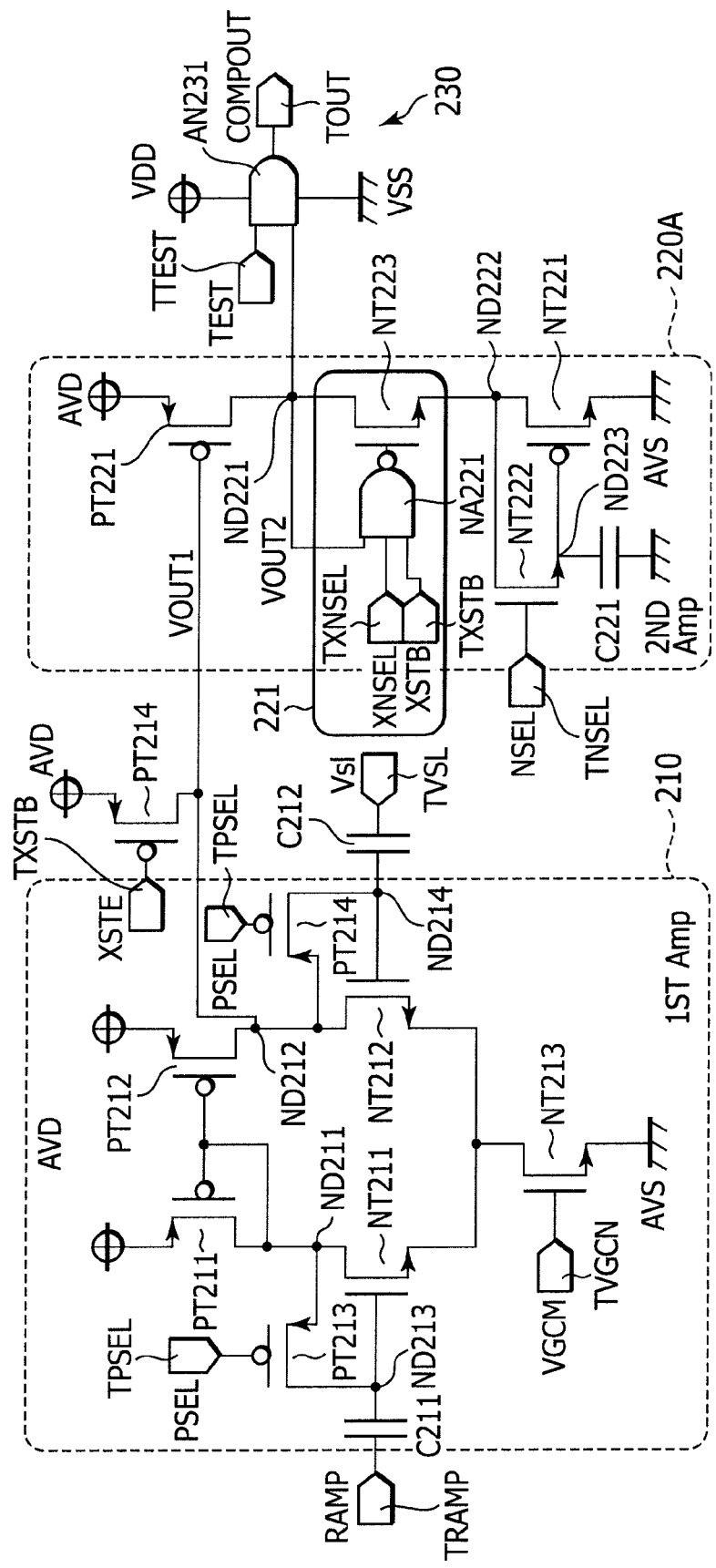
FIG. 9 is a circuit diagram showing an example of a second structure of a comparator according to the present embodiment.

FIG. 9 is a circuit diagram showing an example of a second structure of a comparator according to the embodiment.

A different point of a comparator 200A according to an example of the second structure from the comparator 200 according to an example of the first structure resides in that instead of feeding an output VOUT2 of the second amplifier 220 back to the NAND circuit NA221, an output COMPOUT of an AND circuit AN231 of an output unit 230 at the succeeding stage of a second amplifier 220A is fed back.

The other structures are the same as those of the example of the first structure.

Also in this case, since a signal transit time of the output signal COMPOUT of the output unit 230 is short, through current flowing through the NAND circuit NA221 and the NMOS transistor NT223 as the switch can be minimized.

However, since it is feared that noises may be mixed by coupling of signal lines, layout consideration is required so as not to make a change in the output signal COMPOUT influence an output VOUT2 of the second amplifier.

Figure 10:
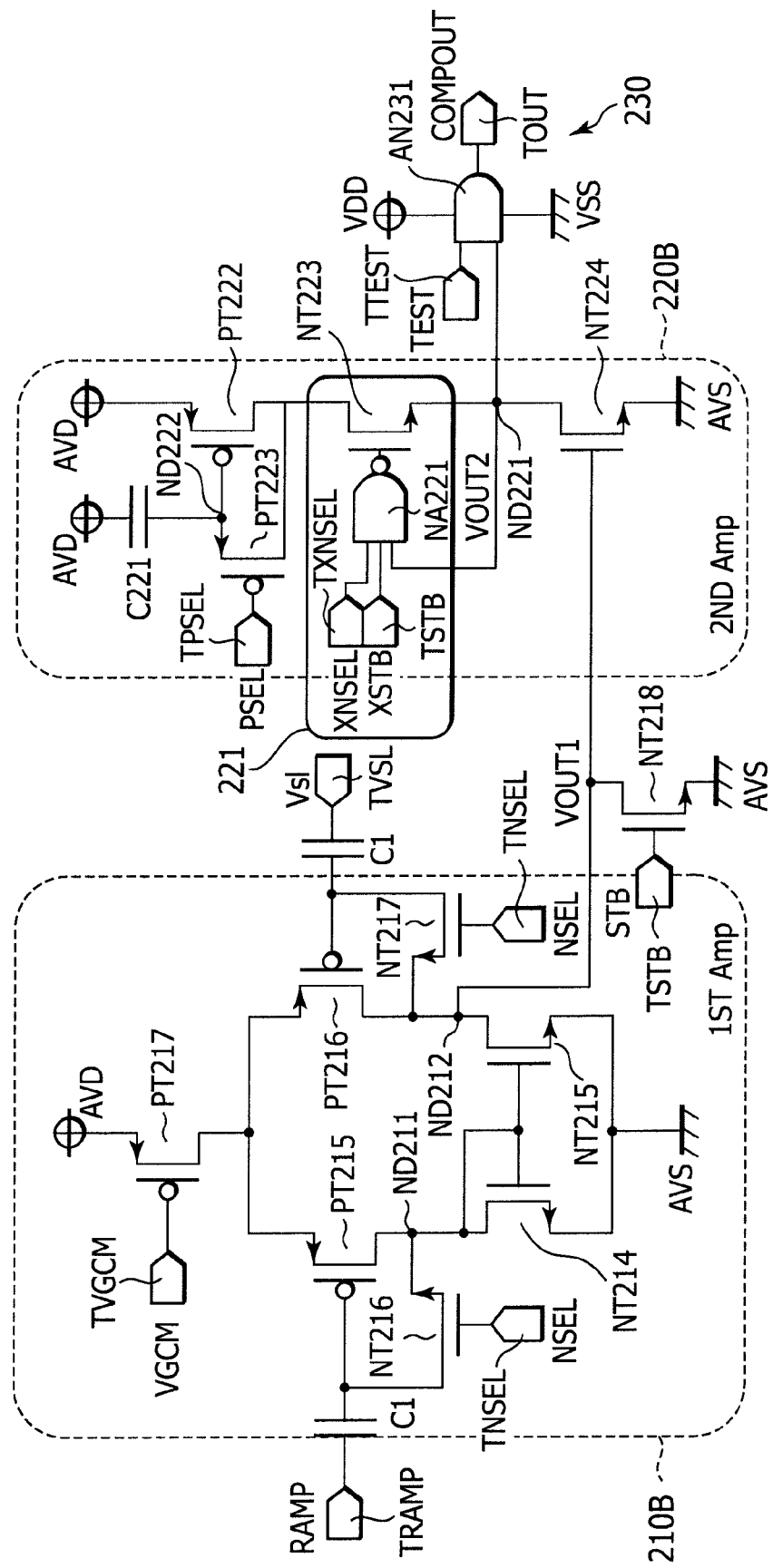
FIG. 10 is a circuit diagram showing a variant example of the first structure of the comparator according to the present embodiment.

FIG. 10 is a circuit diagram showing an example of the first structure of the comparator according to a modification of the embodiment.

A comparator 200B shown in FIG. 10 uses polarities opposite to the polarities of the transistors of the comparator 200 shown in FIG. 5. Therefore, the power source potential and ground potential are connected to the circuit in a reversed manner.

In FIG. 10, reference symbols of the nodes and capacitors are made identical to those shown in FIG. 5 in order to help understand easily.

In a first amplifier 210B, instead of the NMOS transistors NT211 to NT213 shown in FIG. 5, PMOS transistors PT215 to PT217 are used to constitute a differential comparison unit and a current source, and a source of the PMOS transistor PT217 as the current source is connected to the power source potential AVD.

Instead of the PMOS transistors PT211 and PT212 shown in FIG. 5, NMOS transistors NT214 and NT215 are used to constitute a current mirror circuit, and sources of the NMOS transistors NT214 and NT215 are connected to the ground potential GND.

Instead of the PMOS transistors PT213 and PT214 shown in FIG. 5, NMOS transistors NT216 and NT217 are used to constitute AZ switches. In this case, in the first amplifier 210B, the second AZ signal NSEL is supplied to gates of the NMOS transistors NT216 and NT217.

Instead of the PMOS transistor PT214, an NMOS transistor NT218 is used to constitute a standby circuit. A source of the NMOS transistor NT218 is connected to a reference potential AVS (ground potential GND), a drain is connected to the output node ND211 of a second amplifier 220B, and a gate is connected to the input terminal TSTB of the standby signal STB which is active and high level.

In the second amplifier 220B, instead of the PMOS transistor PT221 shown in FIG. 5, an NMOS transistor NT224 is used to constitute an input/current source circuit. A source of the NMOS transistor NT224 is connected to the reference potential AVS (ground potential).

Instead of the NMOS transistor NT221 shown in FIG. 5, a PMOS transistor PT222 is used whose source is connected to the power source potential AVD. A first electrode of a capacitor C221 is connected to a node ND222 connected to the gate of the PMOS transistor PT222, and a second electrode is connected to the power source potential AVD.

Instead of the NMOS transistor NT222 shown in FIG. 5, a PMOS transistor PT223 is used to constitute an AZ switch. In this case, in the second amplifier 220B, a first AZ signal PSEL is supplied to the gate of the PMOS transistor PT223.

The comparator 200B shown in FIG. 10 having the structure described above operates basically in a manner similar to the comparator 200 shown in FIG. 5, and the timing chart shown in FIG. 6 can be applied as it is.

According to the comparator 200B shown in FIG. 10, the advantages similar to those of the comparator 200 shown in FIG. 5 can be obtained.

Figure 11:
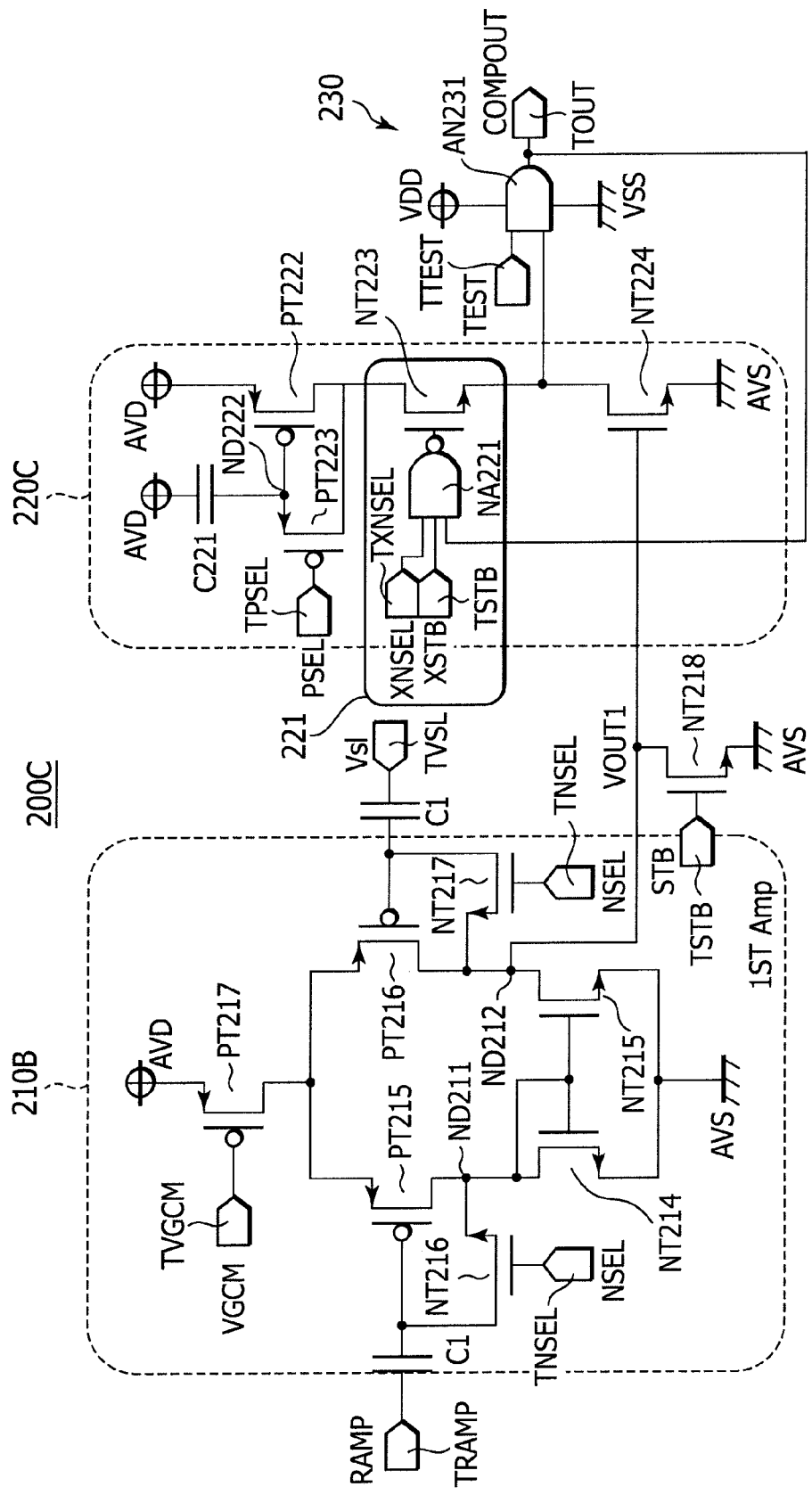
FIG. 11 is a circuit diagram showing an example of the second structure of the comparator according to a modification of the present embodiment.

FIG. 11 is a circuit diagram showing an example of the second structure of a comparator according to a modification of the embodiment.

A different point of a comparator 200C shown in FIG. 11 from the comparator 200B shown in FIG. 10 resides in that instead of feeding an output VOUT2 of the second amplifier 220 back to the NAND circuit NA221, an output COMPOUT of an AND circuit AN231 of an output unit 230 at the succeeding stage of a second amplifier 220 is fed back.

The other structures are the same as those of the example of the structure shown in FIG. 10.

Also in this case, since a signal transit time of the output signal COMPOUT of the output unit 230 is short, through current flowing through the NAND circuit NA221 and the NMOS transistor NT223 as the switch can be minimized.

However, since it is feared that noises may be mixed by coupling of signal lines, layout consideration is required so as not to make a change in the output signal COMPOUT influence an output VOUT2 of the second amplifier.

As described so far, a solid state image pickup device of the embodiment includes a pixel unit 110 having a plurality of pixels for photoelectric conversion disposed in a matrix shape and a pixel signal read circuit (ADC group) 150 for reading data at row unit basis from the pixel unit 110. The ADC group (pixel signal read circuit) 150 includes a plurality of comparators 151 disposed in correspondence with a pixel column layout for performing comparison judgment between a read signal potential and a reference voltage and outputting a judgment signal and a plurality of counters 152 each for counting a comparison time of a corresponding one of the comparators, an operation being controlled by an output from a corresponding one of the comparators. The comparators 151 include a first amplifier 210 for performing a comparison operation between the reference voltage and the read signal potential and inverting an output at a predetermined comparison point, a second amplifier 220 for forming a current path when an output of the first amplifier 210 is inverted, to output an output of the first amplifier 210 by gain up, and a current control circuit 221 for shutting the current path of the second amplifier 220 when an output level of the second amplifier exceeds a predetermined threshold level. Since an analog power source change is suppressed by controlling the mirror circuit by adjusting a value, the following advantages can be obtained.

By turning off the transistor as the switch after inversion of a comparator output, a steady current disappears and low consumption power of the circuit can be realized. According to circuit simulation, an analog consumption current can be reduced by 14%/clm, and the analog and digital consumption current can be reduced by 28.8%/clm.

A change (power source step) in the analog power source state can be alleviated before and after output inversion of comparison so that photographing noises (streaking and shading) to be caused thereby can be suppressed.

A change in the power source state dependent upon lightness is small, and streaking can be improved also in this context.

A logical NAND operation between the output VOUT2 of the second amplifier 220 and the initialization inversion signal XNSEL of the second amplifier allows reliable initialization of the second amplifier. Accordingly, inversion points and process variation resistances are similar to those of already existing products.

Further, a logical NAND operation between the output VOUT2 of the second amplifier and the output standby signal XSTB of the first amplifier 210 allows reliable initialization of the second amplifier. Accordingly, inversion points of the second amplifier are similar to those of already existing products.

The solid state image pickup element having the above-described advantages may be applied as an image pickup device of a digital camera and a video camera.

Figure 12:
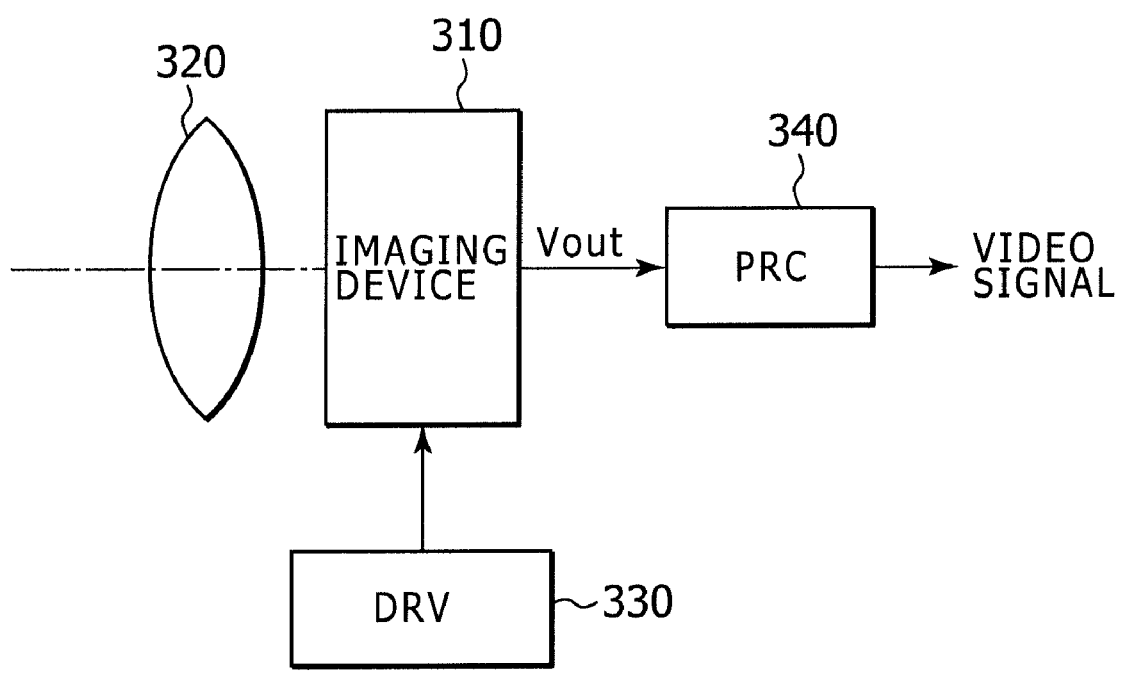
FIG. 12 is a diagram showing an example of the structure of a camera system to which the solid state image pickup device of the present embodiment is applied.

FIG. 12 is a diagram showing an example of the structure of a camera system applied to which is the solid state image pickup device of the embodiment of the present invention.

As shown in FIG. 12, the camera system 300 has an imaging device 310 capable of adopting the solid image pickup element 100 of the embodiment, an optical system for guiding incidence light to (focusing an object image upon) a pixel area of the imaging device 310, e.g., a lens 320 for focusing an incidence light (image light) on a imaging surface, a drive circuit (DRV) 330 for driving the imaging device 310, and a signal processing circuit (PRC) 340 for processing an output signal from the imaging device 310.

The drive circuit 330 has a timing generator (not shown) for generating various timing signals including start pulses and clock pulses for driving circuits in the imaging device 310, and drives the imaging device 310 by using predetermined timing signals.

The signal processing circuit 340 performs predetermined signal processing for an output signal of the imaging device 310.

An image signal processed by the signal processing circuit 340 is recorded in a recording medium such as a memory. Image information recorded in the recording medium is hard copied with a printer or the like. An image signal processed by the signal processing circuit 340 is displayed as moving images on a monitor constituted of a liquid crystal display, or the like.

As described above, in an image pickup device such as a digital still camera, the solid state image pickup element 100 is mounted as the imaging device 310 to realize a high precision camera.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2008-009002 filed in the Japanese Patent Office on Jan. 18, 2008, the entire content of which being incorporated herein by reference.

What is claimed is:

1. An analog to digital conversion apparatus comprising:
   at least one comparator for performing comparison judgment between an analog voltage and a reference voltage and outputting a judgment signal; and
   at least one counter for counting a comparison time of a corresponding comparator, an operation being controlled by an output from the comparator; and wherein:
   the comparator includes:
   a first amplifier for performing a comparison operation between the reference voltage and the analog voltage and inverting an output at a predetermined comparison point;
   a second amplifier providing a current path when an output of the first amplifier is inverted, to output an output of the first amplifier by gain up; and
   a current control circuit for shutting the current path of the second amplifier when an output level of the second amplifier exceeds a predetermined threshold level.

2. The analog to digital conversion apparatus according to claim 1, wherein the current control circuit includes:
   a current switch disposed in the current path of the second amplifier; and
   a logical circuit for maintaining the current switch in an on-state until the output level of the second amplifier exceeds the predetermined threshold level, and turning off the current switch when the output level exceeds the threshold level.

3. The analog to digital conversion apparatus according to claim 2, wherein the second amplifier includes:
   a first conductivity type gate input transistor to a gate of which an output of the first amplifier is input; and
   a second conductivity type transistor serially connected to the first conductivity type transistor wherein an initialization switch for determining an operation point for each column is disposed between a gate and a drain at row operation start and a gate is connected to a capacitor for sampling at an initialization, wherein:
   the current switch of the current control circuit is disposed in the current path including the first conductivity type gate input transistor and the second conductivity type transistor serially connected; and
   the logical circuit performs a logical operation between an output level of the second amplifier and an initialization signal for turning on/off the initialization switch to turn on/off the current switch.

4. The analog to digital conversion apparatus according to claim 2, wherein:
   an output of the first amplifier is adapted to be set to a predetermined level by a standby signal;
   the second amplifier includes:
   a first conductivity type gate input transistor to a gate of which an output of the first amplifier is input; and
   a second conductivity type transistor serially connected to the first conductivity type transistor wherein an initialization switch for determining an operation point for each column is disposed between a gale and a drain and a gate is connected to a capacitor for sampling at an initialization;
   the current switch of the current control circuit is disposed in the current path including the first conductivity type gate input transistor and the second conductivity type transistor serially connected; and the logical circuit performs a logical operation between an output level of the second amplifier and the standby signal to turn on/off the current switch.

5. The analog to digital conversion apparatus according to claim 2, wherein:
an output of the first amplifier is adapted to be set to a predetermined level by a standby signal;
the second amplifier includes;
a first conductivity type gate input transistor to a gate of which an output of the first amplifier is input; and
a second conductivity type transistor serially connected to the first conductivity type transistor wherein an initialization switch for determining an operation point for each column at row operation start is disposed between a gate and a drain and a gate is connected to a capacitor for sampling at an initialization wherein
the current switch of the current control circuit is disposed in the current path including the first conductivity type gate input transistor and the second conductivity type transistor; and
the logical circuit performs a logical operation among an output level of the second amplifier, an initialization signal for turning on/off the initialization switch and the standby signal to turn on/off the current switch.

6. The analog to digital conversion apparatus according to claim 2, wherein the logical circuit turns on/off the current switch in accordance with a level at an output node of the second amplifier.

7. The analog to digital conversion apparatus according to claim 2, further comprising:
an output unit for receiving an output signal of the second amplifier and outputting the output signal as an output signal of the comparator,
wherein the logical circuit turns on/off the current switch in accordance with an output level of the output unit.

8. The analog to digital conversion apparatus according to claim 3, wherein:
the reference voltage has a slope waveform having a gradient and changing linearly;
the first conductivity type gate input transistor of the second amplifier turns off until the read signal and the slope waveform of the reference voltage cross; and
the first amplifier outputs a comparison output having a level allowing the first conductivity type gate input transistor to turn on after crossing, to the second amplifier.

9. The analog to digital conversion apparatus according to claim 4, wherein;
the reference voltage has a slope waveform having a gradient and changing linearly;
the first conductivity type gate input transistor of the second amplifier turns off until the read signal and the slope waveform of the reference voltage cross; and
the first amplifier outputs a comparison output having a level allowing the first conductivity type gate input transistor to turn on after crossing, to the second amplifier.

* * * * *